UNITED STATES PATENT OFFICE.

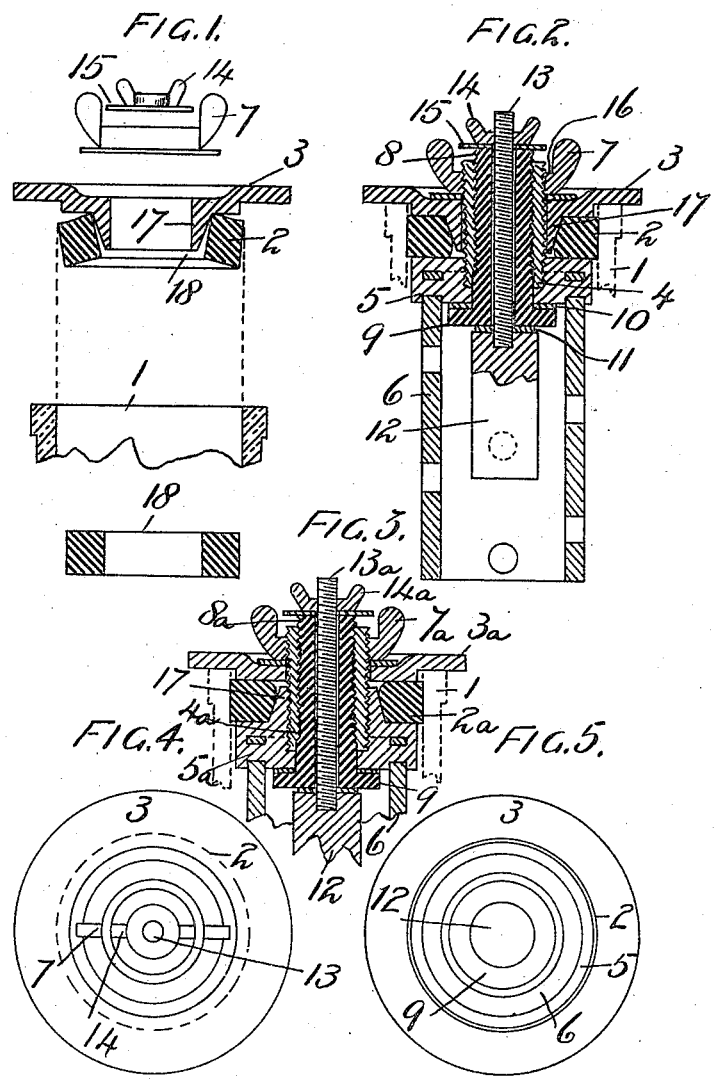

JOHN EDWARD PRESTON, OF LONDON, ENGLAND.

GALVANIC BATTERY.

1,307,102.  Specification of Letters Patent.  Patented June 17, 1919.

Application filed December 30, 1916. Serial No. 139,834.

*To all whom it may concern:*

Be it known that I, JOHN EDWARD PRESTON, a subject of His Majesty King George V of the United Kingdom of Great Britain and Ireland and of the British Dominions Beyond the Sea and Emperor of India, residing at London, England, have invented certain new and useful Improvements in Galvanic Batteries, of which the following is a specification.

This invention relates to improvements in galvanic cells, particularly to a closed galvanic battery cell in which insulated positive and negative elements are combined as one element of a clamp with a cover plate as a complementary clamp element and an intermediate elastic disk to form a removable stopper unit which is establishable into sealing relationship with the containing vessel by more tightly binding the component clamping elements together to put pressure upon the opposite faces of the disk, and in which the insulated conducting means of the positive and negative elements have passage through a common aperture in the elastic sealing disk whereby on compression of the disk a substantially uniform flow of the disk in all radial directions is realized to effect a fluid tight sealing of the cell.

By and in accordance with the present invention provision is so made that during binding movement of the clamping means, compression of the apertured elastic sealing disk is preceded by a tensional expansion of the disk in such wise that an automatic contraction of the disk is allowed as unbinding movement continues after freeing the disk of compression, whereby the apertured disk becomes a reservoir of energy giving it a power of self-contraction on being freed for promoting breakage of the sealing when the stopper unit is required to be withdrawn.

The enlarging and tensioning provision conveniently and advantageously takes the form of a central conical or conoidal boss on the cover clamping plate; this boss entering the disk centrally expands it. This expansion is unsymmetrical, being greater at the top than the bottom. Thus the disk suffers distortion and becomes disposed somewhat in inverted dished form with the side walls substantially conforming to the figure of truncated cones whose apices are directed away from the cover plate. If now pressure be put upon the top and bottom of the disk, this will first be constrained into cylindrical form with tendency on removal of the pressure to return to the dished form, and a continuation of the compression will place the disk under that direct compression which will produce a substantially uniform flow of the disk in all radial directions.

A sealing thus produced has the important advantage of notably promoting the sealing of the cell, also the opening of the cell for recharging and other purposes, for on taking off the clamping pressure the reactionary tendency of the disk to self-contract becomes available for facilitating the breaking down of adhesions with the containing vessel and freeing the seal therefrom, while in the case of the cone a movement of withdrawal of this from the disk would assist the contraction to commence, also to go farther.

In addition to thus countering those adhesions which act so subversively in hindering opening of cells of the type described, an effective sealing, embracing manufacturing irregularities in size and figuring, is made possible without undue bursting stress on the containing vessel.

In the accompanying drawings two ways of carrying out the invention are illustrated by way of example as applied to a single galvanic cell.

Figure 1 is a view of separate details of one constructional form.

Fig. 2 is a sectional elevation of the stopper unit of this constructional form.

Fig. 3 a plan view, and,

Fig. 4 an under view thereof.

Fig. 5 is a view similar to Fig. 2 illustrating the other constructional form.

Referring to Fig. 1 of the drawings, the container 1 is plugged fluid tight by an expanding elastic disk 2, the upper surface of this being in contact with a cover plate 3. Through the expanding disk and cover plate there passes the upper and reduced portion or brass ferrule 4 of a metal cap or contact-piece 5, cast on or fitted to the carbon or negative cylinder 6 which is conveniently cylindrical. The upper part 4 is exteriorly screw threaded to be engaged by a wing-nut 7. An insulating lining 8 formed with an insulating flange 9 is screwed into the ferrule 4 and a rubber washer 10 is interposed between the flange 9 and the contact 5 and a rubber washer 11 between a positive element 12 and the flange 9. A screw threaded stem 13 which is connected to the positive or zinc element 12 passes through the liner 8 and is securely retained therein by the wing-nut 14 co-acting with the stem 13. A metal washer 15 is interposed between the wing-nut 14 and the liner 8; this washer being sufficiently large in diameter to extend over the part 16 of the wing nut, to thereby prevent the latter from becoming detached when being unscrewed.

On the bottom of the cover plate 3 is a conical or conodial boss 17 adapted to enter the aperture 18 of the disk 2 and centrally expand this unsymmetrically as shown in Fig. 1.

By tightening up the wing-nut 7, the elastic disk 2 becomes first constrained into cylindrical form and thereafter is evenly compressed between the contact 13 and the cover plate 3 to fluid-tightly seal the containing vessel by the lateral expansion and substantially uniform flow of the elastic disk when in the neck of the container 1.

By untightening the wing-nut 7, the disk 2 first becomes relieved of compression and thereafter is freed by the cone for automatic contraction.

Referring to Fig. 5 of the drawings, a form is here depicted showing that in carrying out the present invention the arrangement of the cone 17 may differ from that illustrated in the previous figures in the respect that it can be integral with or fixed to the carbon contact 5 so as to project the apex upward.

In the modified construction according to Fig. 5, the container is plugged fluid tight by an expanding elastic disk 2$^a$, the upper surface of this being in contact with a cover plate 3$^a$ which is unprovided with a conical or conoidal boss as is the case in the construction according to Fig. 2. But this conical or conoidal boss 17$^a$ is transferred to the carbon contact 5$^a$, from which, as in the previous construction, rises an upper or reduced portion or brass ferrule 4$^a$, this upper part 4 passing through the expanding disk and cover plate and being exteriorly screw-threaded to be engaged by a wing nut 7$^a$. An insulating lining 8$^a$ formed with an insulating flange is screwed into the ferrule 4 and a rubber washer is interposed between the flange and the contact 5$^a$ and a rubber washer between the positive element 12$^a$ and the flange. A screw-threaded stem 13$^a$ which is connected to the positive or zinc element 12$^a$ passes through the lining and is securely retained therein by the wing nut 14$^a$ co-acting with the stem 13$^a$, a metal washer being interposed between the wing nut 14$^a$ and the lining. It will be seen that the construction illustrated in Fig. 3 is like or similar to that illustrated in Fig. 2 except that the cone 17$^a$ projects upward from the contact piece 5$^a$ instead of projecting downward from the cover plate 3.

With this modified arrangement the effect would be that on drawing the clamping cover member 3, which would now be a flat member as shown, toward the carbon clamping member 5, the rubber ring 2 would expand most at the bottom instead of at the top as formerly, thereby bringing the zone of greatest compression of the sealing adjacent to the top of the carbon element 6 and therefore lower in the neck of the container. Otherwise the arrangements according to Figs. 2 and 5 are comparable in working.

What I claim is:—

1. A removable stopper unit for a closed galvanic battery cell, including in combination a stem, insulated positive and negative elements mounted thereon one within the other and comprising one element of a clamp, insulated conductors connected to said electrodes one conductor within the other, an elastic ring fitted loosely over said conductors above said clamp element, a cover plate forming the complementary clamp element, means on the outer conductor for drawing the clamping parts toward one another, and a tapering member located between said clamping elements substantially as and for the purposes set forth.

2. A removable stopper unit for a closed galvanic battery cell, including in combination a stem, insulated positive and negative elements mounted thereon one within the other and comprising one element of a clamp, insulated conductors connected to said electrodes one conductor within the other, an elastic ring fitted loosely over said conductors above said clamp element, a cover plate forming the complementary clamp element, means on the outer conductor for drawing the clamping parts toward one another, and a tapering boss on one of said clamping elements substantially as and for the purposes set forth.

In testimony whereof I affix my signature.

JOHN EDWARD PRESTON.